(12) United States Patent
Yang et al.

(10) Patent No.: US 11,147,077 B2
(45) Date of Patent: Oct. 12, 2021

(54) METHOD, TERMINAL DEVICE AND NETWORK DEVICE FOR SCHEDULING RESOURCES

(71) Applicant: GUANGDONG OPPO MOBILE TELECOMMUNICATIONS CORP., LTD., Guangdong (CN)

(72) Inventors: Ning Yang, Dongguan (CN); Zhi Zhang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 55 days.

(21) Appl. No.: 16/624,870

(22) PCT Filed: Aug. 18, 2017

(86) PCT No.: PCT/CN2017/098139
§ 371 (c)(1),
(2) Date: Dec. 19, 2019

(87) PCT Pub. No.: WO2019/033424
PCT Pub. Date: Feb. 21, 2019

(65) Prior Publication Data
US 2020/0137763 A1 Apr. 30, 2020

(51) Int. Cl.
*H04W 72/04* (2009.01)
*H04W 72/12* (2009.01)
(Continued)

(52) U.S. Cl.
CPC ......... *H04W 72/082* (2013.01); *H04L 5/0082* (2013.01); *H04W 72/0453* (2013.01); *H04W 72/0493* (2013.01)

(58) Field of Classification Search
CPC . H04L 27/2601; H04L 5/0048; H04L 1/1671; H04L 1/1861; H04L 5/0053;
(Continued)

(56) References Cited

U.S. PATENT DOCUMENTS 8,447,312 B2 * 5/2013 Uemura ................ H04L 5/0053
455/450
8,942,746 B2 1/2015 Catovic
(Continued)

FOREIGN PATENT DOCUMENTS

CN 102598817 A 7/2012
CN 103563470 A 2/2014
(Continued)

OTHER PUBLICATIONS

International Search Report in the international application No. PCT/CN2017/098139, dated Mar. 2, 2018.
(Continued)

*Primary Examiner* — Sai Aung
(74) *Attorney, Agent, or Firm* — Ladas & Parry, LLP (57) ABSTRACT

An embodiment of the application relates to a method, terminal device and network device for scheduling resources. The method comprises a terminal device determining a first resource, wherein the first resource is an available resource or an unavailable resource, the unavailable resource is a resource that the second resource interferes with, and/or that is capable of interfering with the second resource, the available resource is a resource other than the unavailable resource, and the second resource is used by the terminal device in a second communications mode to communicate with a second network; and the terminal device transmitting first resource information to the first network device, wherein the first resource information includes the first resource, the first resource information is used by the
(Continued)

first network device to allocate resources to the terminal device, and the terminal device is used to communicate with the first network device in a first communications mode. The resource allocation method, terminal device and network device of the embodiment of the application enables the reduction or avoidance of interference.

20 Claims, 3 Drawing Sheets

(51) Int. Cl.
*H04W 72/08* (2009.01)
*H04L 5/00* (2006.01)

(58) Field of Classification Search
CPC . H04L 25/0224; H04L 1/0031; H04L 1/1685; H04L 1/1887; H04L 5/0051; H04L 1/0007; H04L 1/0088; H04L 1/1854
See application file for complete search history.

(56) References Cited

U.S. PATENT DOCUMENTS

| | | |
|---|---|---|
| 9,232,526 B2 | 1/2016 | Novak |
| 9,350,477 B1 | 5/2016 | Jung et al. |
| 9,450,694 B1 | 9/2016 | Jung et al. |
| 2011/0218004 A1 | 9/2011 | Catovic |
| 2013/0044621 A1 | 2/2013 | Hyejung |
| 2014/0126483 A1 | 5/2014 | Novak |
| 2014/0269453 A1* | 9/2014 | Papasakellariou .......................... H04W 72/0413 370/280 |
| 2015/0245334 A1 | 8/2015 | Chang |
| 2016/0095104 A1* | 3/2016 | Chen ..................... H04L 5/0048 370/329 |
| 2016/0095105 A1* | 3/2016 | Chen ..................... H04L 5/0053 370/329 |
| 2016/0095137 A1* | 3/2016 | Chen ..................... H04L 25/0224 370/329 |
| 2017/0264466 A1* | 9/2017 | Hosseini ............. H04L 25/0236 |
| 2017/0265166 A1* | 9/2017 | Hosseini ............... H04W 24/08 |

FOREIGN PATENT DOCUMENTS

| | | |
|---|---|---|
| CN | 104883743 A | 9/2015 |
| EP | 3641378 A1 | 4/2020 |
| WO | 2015023163 A1 | 2/2015 |

OTHER PUBLICATIONS

Written Opinion of the International Search Authority in the international application No. PCT/CN2017/098139, dated Mar. 2, 2018 and English translation provided by Google Translate.
ZTE et al.: "Discussion on NR-LTE Co-existence", 3GPP Draft; R1-1701618-8.1.8 Discussion on NR-LTE Coexistence, 3rd Generation Partnership Project (3GPP), Mobile Competence Centre; 650, Route Des Lucioles: F-06921 Sophia-Antipolis Cedex France vol. Ran WG1, No. Athens, Greece; Feb. 13, 2017-Feb. 17, 2017 Feb. 12, 2017 (Feb. 12, 2017), XP051208785, * sections 3.1, 3.2 *.
Guangdong Oppo Mobile Telecom: "Discussion on the NR-LTE self-interference issue", 3GPP Draft; R1-1710173. 3rd Generation Partnership Project (3GPP), Mobile Competence Centre; 650, Route Des Lucioles; F-06921 Sophia-Antipolis Cedex; France, vol. RAN WG1, No. Qingdao, P.R. China;Jun. 27, 2017-Jun. 30, 2017 Jun. 26, 2017 (Jun. 26, 2017), XP051299397, * section 2 *.
Supplementary European Search Report in the European application No. 17921705.4, dated May 29, 2020.
Written Opinion of the International Search Authority in the international application No. PCT/CN2017/098139, dated Mar. 2, 2018.
First Office Action of the Chilean application No. 202000104, dated Mar. 16, 2021.
Second Office Action of the Chilean application No. 202000104, dated May 20, 2021.
Office Action of the Indian application No. 202017000304, dated Apr. 27, 2021.

* cited by examiner

100

A terminal device determines a first resource, here, the first resource includes an available resource or an unavailable resource, the unavailable resource includes at least one of a resource interfered with by a second resource or a resource capable of interfering with a second resource, the available resource includes a resource except the unavailable resource, and the second resource is used for the terminal device to communicate with a second network device in a second communication mode  ⟶ S110

The terminal device transmits first resource information to a first network device, here, the first resource information includes information about the first resource, the first resource information is used for the first network device to allocate a resource to the terminal device, and the terminal device is configured to communicate with the first network device in a first communication mode  ⟶ S120

A first network device receives first resource information transmitted by a terminal device, here, the first resource information includes information about a first resource, the first resource includes an available resource or an unavailable resource, the unavailable resource includes at least one of a resource interfered with by a second resource or a resource capable of interfering with a second resource, the available resource includes a resource except the unavailable resource, the terminal device is configured to communicate with the first network device in a first communication mode, and the second resource is used for the terminal device to communicate with a second network device in a second communication mode  ⟶ S210

The first network device allocates a resource to the terminal device according to the first resource information  ⟶ S220

FIG. 6

METHOD, TERMINAL DEVICE AND NETWORK DEVICE FOR SCHEDULING RESOURCES

CROSS-REFERENCE TO RELATED APPLICATION

The application is a national phase application of International Patent Application No. PCT/CN2017/098139, filed on Aug. 18, 2017, the content of which is hereby incorporated by reference in its entirety.

TECHNICAL FIELD

The disclosure relates to the field of communications, and more particularly to a method for resource scheduling, a terminal device and a network device.

BACKGROUND

At present, a terminal device may support a Long Term Evolution (LTE) communication over a frequency band of 2 GHz. A New Radio (NR) communication may be performed over a frequency band below 6 GHz. When a terminal device may perform LTE and NR communications simultaneously, mutual interference (for example, cross modulation interference or harmonic interference) may be generated between two frequency bands, so that the LTE communication and the NR communication cannot be performed simultaneously. For example, Transmission (TX) of the terminal device in the LTE communication may interfere with Reception (RX) in the NR communication, and similarly, TX of the terminal device in the NR communication may also interfere with RX in the LTE communication.

For solving this problem, at present, a solution proposed in Radio Access Network (RAN) of the 3rd Generation Partnership Project (3GPP) is to perform transmission of an NR uplink over a frequency band (2 GHz) of LTE to avoid interference of NR TX with LTE RX. However, such a solution is only applied to the architecture of Carrier Aggregation (CA) and has some limitations. For a more general scenario, when a terminal device has both an LTE service and an NR service, a conflict may still occur.

SUMMARY

The disclosure provides a method for resource scheduling, a terminal device and a network device, which may reduce or avoid interference.

In a first aspect, there is provided a method for resource scheduling, which may include the following operations.

A terminal device determines a first resource. Here, the first resource includes an available resource or an unavailable resource, the unavailable resource includes at least one of: a resource interfered with by a second resource or a resource capable of interfering with a second resource, the available resource includes a resource except the unavailable resource, and the second resource is used for the terminal device to communicate with a second network device in a second communication mode.

The terminal device transmits first resource information to a first network device. Here, the first resource information includes information about the first resource, the first resource information is used for the first network device to allocate a resource to the terminal device, and the terminal device is configured to communicate with the first network device in a first communication mode.

Accordingly, in the method for resource scheduling according to embodiments of the disclosure, a terminal device may support at least two communication modes and may determine interference between resources used in different communication modes; and then the terminal device determines an unavailable resource and sends to a network device resource information indicating the unavailable resource, so that the network device allocates an available resource to the terminal device according to the resource information. In such a manner, interference between transmission services in different communication modes may be reduced or avoided and transmission efficiency may be improved.

In an embodiment, the available resource may include a resource which is not interfered with by the second resource and which is incapable of interfering with the second resource, and may further include a resource which is not interfered with by the second resource.

In combination with the first aspect, in an implementation mode of the first aspect, the first resource includes the available resource, the available resource may include at least one carrier, and the first resource information may be used to instruct the first network device to allocate a carrier of the at least one carrier to the terminal device.

In combination with the first aspect, in an implementation mode of the first aspect, the first resource includes the unavailable resource, the unavailable resource may include at least one carrier, and the first resource information may be used to instruct the first network device to allocate a carrier except the at least one carrier to the terminal device.

In combination with the first aspect and the abovementioned implementation modes thereof, in another implementation mode of the first aspect, the at least one carrier may include multiple discontinuous carriers.

In combination with the first aspect and the abovementioned implementation modes thereof, in another implementation mode of the first aspect, the first resource includes the available resource, the available resource may include at least one Transmission Time Interval (TTI), and the first resource information may be used to instruct the first network device to configure the terminal device to perform at least one of Reception (RX) or Transmission (TX) with the first network device in the at least one TTI.

In combination with the first aspect and the abovementioned implementation modes thereof, in another implementation mode of the first aspect, the first resource includes the unavailable resource, the unavailable resource may include at least one TTI, and the first resource information may be used to instruct the first network device to configure the terminal device to perform RX or TX with the first network device in the at least one TTI, or the first resource information may be used to instruct the first network device to configure the terminal device not to perform RX and TX with the first network device in the at least one TTI.

In combination with the first aspect and the abovementioned implementation modes thereof, in another implementation mode of the first aspect, the at least one TTI may be discontinuous.

In combination with the first aspect and the abovementioned implementation modes thereof, in another implementation mode of the first aspect, the first resource information may include a length of the at least one TTI.

In combination with the first aspect and the abovementioned implementation modes thereof, in another implementation mode of the first aspect, the at least one TTI may be equal in length.

In combination with the first aspect and the abovementioned implementation modes thereof, in another implementation mode of the first aspect, the length of each of the at least one TTI may be less than 1 ms.

In combination with the first aspect and the abovementioned implementation modes thereof, in another implementation mode of the first aspect, the first resource includes the unavailable resource, and the first resource information may be used to indicate an interference degree of the unavailable resource, the interference degree includes at least one of: a degree of interference of the second resource with the unavailable resource or a degree of interference of the unavailable resource with the second resource.

In combination with the first aspect and the abovementioned implementation modes thereof, in another implementation mode of the first aspect, the available resource may include a resource except the unavailable resource and a third resource, here, the third resource is used for the terminal device to communicate with another terminal device.

In combination with the first aspect and the abovementioned implementation modes thereof, in another implementation mode of the first aspect, the method may further include the following operation.

The terminal device transmits second resource information to the second network device, here, the second resource information includes information about the second resource or another resource, and the another resource includes a resource except the second resource.

In combination with the first aspect and the abovementioned implementation modes thereof, in another implementation mode of the first aspect, interference between the unavailable resource and the second resource may include at least one of: cross modulation interference, harmonic interference, or harmonic mixing interference.

In combination with the first aspect and the abovementioned implementation modes thereof, in another implementation mode of the first aspect, the terminal device may communicate with the first network device over a first frequency band, and the terminal device may communicate with the second network device over a second frequency band, here, the first frequency band is as same as the second frequency band or the first frequency band is different from the second frequency band.

In combination with the first aspect and the abovementioned implementation modes thereof, in another implementation mode of the first aspect, the terminal device may communicate with the first network device on a first communication resource, and the terminal device may communicate with the second network device on a second communication resource, here, the first communication resource has no overlap with the second communication resource.

Accordingly, in the method for resource scheduling according to the embodiments of the disclosure, the terminal device may support the at least two communication modes and may determine the interference between the resources used in different communication modes; and then the terminal device determines the unavailable resource and transmits to the network device the resource information used to indicate the unavailable resource, so that the network device allocates the available resource to the terminal device according to the resource information. Therefore, the interference between the transmission services in different communication modes may be reduced or avoided and the transmission efficiency may be improved.

In a second aspect, there is provided a method for resource scheduling, which may include the following operations.

A first network device receives first resource information transmitted by a terminal device. Here, the first resource information includes information about a first resource, the first resource includes an available resource or an unavailable resource, the unavailable resource includes at least one of: a resource interfered with by a second resource or a resource capable of interfering with a second resource, the available resource includes a resource except the unavailable resource, the terminal device is configured to communicate with the first network device in a first communication mode, and the second resource is used for the terminal device to communicate with a second network device in a second communication mode.

The first network device allocates a resource to the terminal device according to the first resource information.

Accordingly, in the method for resource scheduling according to the embodiments of the disclosure, a network device receives resource information transmitted by a terminal device, here, the resource information indicates an unavailable resource, the unavailable resource may be determined by the terminal device supporting at least two communication modes, and the terminal device determines interference between resources used in different communication modes and then determines the unavailable resource; and the network device allocates an available resource to the terminal device according to the resource information. In such a manner, interference between transmission services in different communication modes may be reduced or avoided and transmission efficiency may be improved.

In combination with the second aspect, in an implementation mode of the second aspect, the first resource may include at least one carrier, and the operation that the first network device allocates the resource to the terminal device according to the first resource information may include the following operations.

When the first resource includes the available resource, the first network device allocates a carrier of the at least one carrier to the terminal device.

When the first resource includes the unavailable resource, the first network device allocates a carrier except the at least one carrier to the terminal device.

In combination with the second aspect and the abovementioned implementation mode thereof, in another implementation mode of the second aspect, the at least one carrier may include multiple discontinuous carriers.

In combination with the second aspect and the abovementioned implementation modes thereof, in another implementation mode of the second aspect, the first resource may include at least one TTI, and the operation that the first network device allocates the resource to the terminal device according to the first resource information may include the following operations.

When the first resource includes the available resource, the first network device configures the terminal device to perform at least one of RX or TX with the first network device in the at least one TTI.

When the first resource includes the unavailable resource, the first network device configures the terminal device to perform RX or TX with the first network device in the at least one TTI, or the first network device configures the terminal device not to perform RX and TX with the first network device in the at least one TTI.

In combination with the second aspect and the above-mentioned implementation modes thereof, in another implementation mode of the second aspect, the at least one TTI may be discontinuous.

In combination with the second aspect and the above-mentioned implementation modes thereof, in another implementation mode of the second aspect, the first resource information may include a length of the at least one TTI.

In combination with the second aspect and the above-mentioned implementation modes thereof, in another implementation mode of the second aspect, the first resource may include the unavailable resource, and the first resource information may be used to indicate an interference degree of the unavailable resource, the interference degree includes at least one of: a degree of interference of the second resource with the unavailable resource or a degree of interference of the unavailable resource with the second resource.

In combination with the second aspect and the above-mentioned implementation modes thereof, in another implementation mode of the second aspect, the operation that the first network device allocates the resource to the terminal device according to the first resource information may include the following operations.

The first network device allocates the resource to the terminal device according to the interference degree of the unavailable resource in the first resource information. In an embodiment, when there are multiple unavailable resources, the resource allocated by the first network device to the terminal device may include a resource as a part of resources with low interference degrees among the unavailable resources indicated by the first resource information.

In combination with the second aspect and the above-mentioned implementation modes thereof, in another implementation mode of the second aspect, the terminal device may communicate with the first network device by occupying a first frequency band, and the terminal device may communicate with the second network device by occupying a second frequency band, here, the first frequency band is different from the second frequency band.

In combination with the second aspect and the above-mentioned implementation modes thereof, in another implementation mode of the second aspect, the terminal device may communicate with the first network device by occupying a first communication resource, and the terminal device may communicate with the second network device by occupying a second communication resource, the first communication resource has no overlap with the second communication resource.

Accordingly, in the method for resource scheduling according to the embodiments of the disclosure, the network device receives the resource information transmitted by the terminal device, here, the resource information indicates the unavailable resource, the unavailable resource may be determined by the terminal device supporting the at least two communication modes, and the terminal device determines the interference between the resources used in different communication modes and then determines the unavailable resource; and the network device allocates the available resource to the terminal device according to the resource information. Therefore, the interference between the transmission services in different communication modes may be reduced or avoided and the transmission efficiency may be improved.

In a third aspect, there is provided a terminal device, which is configured to execute the method in the first aspect or any possible implementation mode of the first aspect. The terminal device includes units configured to execute the method in the first aspect or any possible implementation mode of the first aspect.

In a fourth aspect, there is provided a network device, which is configured to execute the method in the second aspect or any possible implementation mode of the second aspect. The network device includes units configured to execute the method in the second aspect or any possible implementation mode of the second aspect.

In a fifth aspect, there is provided a terminal device, which includes a memory and a processor. The memory is configured to store an instruction. The processor is configured to execute the instruction stored in a memory. When the processor executes the instruction stored in the memory, such execution enables the processor to execute the method in the first aspect or any possible implementation mode of the first aspect.

In a sixth aspect, there is provided a network device, which includes a memory and a processor. The memory is configured to store an instruction. The processor is configured to execute the instruction stored in a memory. When the processor executes the instruction stored in the memory, such execution enables the processor to execute the method in the second aspect or any possible implementation mode of the second aspect.

In a seventh aspect, there is provided a computer-readable medium, which is configured to store a computer program. The computer program includes an instruction configured to execute the method in the first aspect or any possible implementation mode of the first aspect.

In an eighth aspect, there is provided a computer-readable medium, which is configured to store a computer program. The computer program includes an instruction configured to execute the method in the second aspect or any possible implementation mode of the second aspect.

In a ninth aspect, there is provided a computer program product including an instruction. When a computer runs the instruction in the computer program product, the computer executes the method for resource scheduling in the first aspect or any possible implementation mode of the first aspect. The computer program product may be run on the terminal device in the third aspect.

In a tenth aspect, there is provided a computer program product including an instruction. When a computer runs the instruction in the computer program product, the computer executes the method for resource scheduling in the second aspect or any possible implementation mode of the second aspect. The computer program product may be run on the network device in the fourth aspect.

BRIEF DESCRIPTION OF DRAWINGS

FIG. 1 is a flowchart of a method for resource scheduling according to an embodiment of the disclosure.

FIG. 2 is another flowchart of a method for resource scheduling according to an embodiment of the disclosure.

DETAILED DESCRIPTION

The technical solutions in the embodiments of the disclosure will be described below in combination with the drawings.

The technical solutions of the embodiments of the disclosure may be applied to various communication systems, for example, an LTE system, an LTE Frequency Division Duplex (FDD) system, LTE Time Division Duplex (TDD), a 4.5th Generation (4.5G) network, a 5th Generation (5G) network and NR and the like.

A terminal device involved in the embodiments of the disclosure may be a mobile phone, a pad, a computer with a wireless transmission and reception function, a Virtual Reality (VR) terminal device, an Augmented Reality (AR) terminal device, a wireless terminal for industrial control, a wireless terminal for self driving, a wireless terminal for remote medical surgery, a wireless terminal for a smart grid, a wireless terminal for transportation safety, a wireless terminal for smart city, a wireless terminal for smart home and the like.

A network device involved in the embodiments of the disclosure is a device which is deployed in a RAN to provide a wireless communication function for the terminal device. The network device may be a base station, and the base station may include macro base stations, micro base stations, relay stations, access points and the like in various forms. In systems adopting different radio access technologies, a device with a base station function may have different names. For example, the device is called an Evolved NodeB (eNB or eNodeB) in an LTE network, or is called a Node B in a 3rd Generation (3G) network or the like.

The base station and the terminal device may be deployed on the land including indoors or outdoors and be deployed in a handheld or vehicle-mounted form. The base station and the terminal device may also be deployed on the water. The base station and the terminal device may further be deployed on an airplane, balloon and satellite in the air. An application scenario for the base station and the terminal device is not limited in the embodiments of the disclosure.

FIG. 1 is a flowchart of a method 100 for resource scheduling according to an embodiment of the disclosure. The method 100 may be performed by a terminal device. As illustrated in FIG. 1, the method 100 includes the following operations.

In S110, the terminal device determines a first resource, here, the first resource includes an available resource or an unavailable resource, the unavailable resource includes at least one of: a resource interfered with by a second resource or a resource capable of interfering with a second resource, the available resource includes a resource except the unavailable resource, and the second resource is used for the terminal device to communicate with a second network device in a second communication mode.

In S120, the terminal device transmits first resource information to a first network device, here, the first resource information includes information about the first resource, the first resource information is used for the first network device to allocate a resource to the terminal device, and the terminal device is configured to communicate with the first network device in a first communication mode.

In the disclosure, the terminal device may support at least two communication modes and the at least two communication modes may include the first communication mode and the second communication mode. For example, the first communication mode may be an LTE communication mode, and the second communication mode may be an NR communication mode. However, the embodiment of the disclosure is not limited thereto.

In the embodiment of the disclosure, descriptions are made with the first communication mode and second communication mode supported by the terminal device as an example. The terminal device may adopt the first communication mode to communicate with the first network device and the terminal device may further adopt the second communication mode to communicate with the second network device. The first network device and the second network device may be two different network devices, that is, the first network device supports the first communication mode and the second network device supports the second communication mode. Or the first network device and the second network device may be a same network device supporting at least two communication modes, that is, the first network device may be the network device which works in the first communication mode and the second network device may be the network device which works in the second communication mode.

In the disclosure, the terminal device may communicate with the first network device over a first frequency band and the terminal device may communicate with the second network device over a second frequency band. The first frequency band may be the same as or different from the second frequency band. For example, the terminal device communicates with the first network device over 2 GHz in the LTE communication mode, that is, the first frequency band is 2 GHz. The terminal device communicates with the second network device over a frequency band below 6 GHz in the NR communication mode. For example, the frequency band of 2 GHz may also be adopted, that is, the second frequency band is also 2 GHz, and in such case, the first frequency band is equal to the second frequency band. Or the terminal device may not communicate with the second network device over the frequency band of 2 GHz, and in such case, the first frequency band is not equal to the second frequency band. The embodiment of the disclosure is not limited thereto.

The terminal device may communicate with the first network device on a first communication resource and the terminal device may communicate with the second network device on a second communication resource. The first communication resource may overlap with the second communication resource, or the first communication resource has no overlap with the second communication resource at all. In an embodiment, in addition to the first communication resource and the second communication resource, the terminal device may further include another resource used for communication with another terminal device except the terminal device itself, for example, for communication with a Bluetooth device, Global Positioning System (GPS) or Wireless Fidelity (WiFi) device or the like. The embodiment of the disclosure is not limited thereto.

Since there may be interference between the first communication resource adopted by the terminal device to communicate with the first network device and the second communication resource adopted by the terminal device to communicate with the second network device, the embodiment of the disclosure discloses the method 100 for resource scheduling to reduce the interference or avoid the interference.

In S110, the terminal device determines the first resource, and the first resource may be the available resource or the unavailable resource. The unavailable resource may include at least one of: a resource interfered with by the second resource or a resource capable of interfering with the second resource. That is, the unavailable resources may include at least one of: all or part of resources interfered with by the second resource or all or part of resources capable of interfering with the second resource, and the available resources may include all or part of resources except the unavailable resources. The second resource includes a resource used for communication between the terminal device and the second network device.

For example, the unavailable resources may include all or part of resources interfered with by the second resource, and thus the available resources may include all or part of resources except the unavailable resources. For example, the available resources may include all or part of resources which are not interfered with by the second resource and which do not interfere with the second resource. Or the available resource may further include a resource which does not interfere with the second resource.

For another example, the unavailable resources may include all or part of resources which are interfered with by the second resource and which interfere with the second resource, and thus the available resources may include all or part of resources except the unavailable resources. That is, the available resources include all or part of resources which are not interfered with by the second resource and which do not interfere with the second resource.

The available resources may include all or part of resources except the unavailable resource(s). In an embodiment, the available resource may include a resource which serves as a part of resources except the unavailable resource (s), and for example, the available resource may include a resource except the unavailable resource and a third resource, here, the third resource may be used for the terminal device to communicate with another network device or another terminal device. For example, the third resource may be used for the terminal device to communicate with a third network device other than the first network device and the second network device. In an embodiment, the terminal device may communicate with the third network device in a third communication mode. For another example, the third resource may also be used for the terminal device to communicate with another terminal device other than the terminal device itself, and the another terminal device may be a Bluetooth device, GPS or WiFi device or the like in other terminal devices. The embodiment of the disclosure is not limited thereto.

The terminal device determines resources interfered with by the second resource, and may determine all of the resources as unavailable resources or may also determine a part of the resources as unavailable resources. For example, the terminal device may determine, from the resources according to a degree of interference to which each of the resources is subjected (i.e., a degree of interference of the second resource with each of the resources), one or more resources with high interference degrees as unavailable resources, and the remaining resources are still available resources. Similarly, all or part of resources which are determined by the terminal device and which are capable of interfering with the second resource may also be determined as unavailable resources.

In the embodiment of the disclosure, the terminal device may determine interference between the unavailable resource and the second resource. The interference may include any one or more types of interference. For example, the interference may include at least one of: cross modulation interference, harmonic interference, or harmonic mixing interference. The terminal device may determine the interference between the unavailable resource and the second resource in various manners. For example, an interference determination manner in a related art may be adopted. There are no elaborations made herein.

In S120, the terminal device transmits the first resource information to the first network device, here, the first resource information includes information about the first resource, such that the first network device allocates, according to the first resource information, to the terminal device the resource for data transmission with the first network device. The first resource which is indicated in the first resource information transmitted to the first network device by the terminal device may include the available resource (there are one or more available resources), and thus the first network device allocates a resource of the available resources to the terminal device. The first resource which is indicated in the first resource information transmitted to the first network device by the terminal device may include the unavailable resource (there are one or more unavailable resources), and thus the first network device may allocate the resource to the terminal device according to the unavailable resources. For example, a resource except the unavailable resources may be allocated to the terminal device; or a part of resources may be selected from the unavailable resources and are allocated to the terminal device. For example, a part of resources with low interference degrees may be selected from the unavailable resources according to a degree of interference of the second resource with each of the unavailable resources or a degree of interference of each of the unavailable resources with the second resource, and the part of resources may still be allocated to the terminal device.

In an embodiment, the terminal device may also transmit second resource information to the second network device, here, the second resource information includes information about the second resource or another resource and the another resource includes a resource except the second resource, such that the second network device allocates, according to the second resource information, to the terminal device a resource for data transmission with the second network device.

In the embodiment of the disclosure, the first resource may include a frequency-domain resource or may include a time-domain resource.

In an embodiment, the first resource may include at least one carrier; if the first resource is the available resource, the at least one carrier is the available resource; and if the first resource is the unavailable resource, the at least one carrier is the unavailable resource. If the at least one carrier is the available resource, the first resource information transmitted to the first network device by the terminal device includes information about the at least one carrier, and the first network device allocates a carrier of the at least one carrier to the terminal device according to the first resource information. If the at least one carrier is the unavailable resource, the first resource information transmitted to the first network device by the terminal device includes information about the at least one carrier, and the first network device avoids allocating the at least one carrier to the terminal device according to the first resource information, that is, a carrier except the at least one carrier is allocated to the terminal device.

In an embodiment, the at least one carrier may include multiple continuous carriers or may include multiple discontinuous carriers. For example, the at least one carrier may be a carrier set.

In an embodiment, the first resource may further include at least one TTI; if the first resource is the available resource, the at least one TTI is the available resource; and if the first resource is the unavailable resource, the at least one TTI is the unavailable resource. If the at least one TTI is the available resource, the first resource information transmitted to the first network device by the terminal device includes information about the at least one TTI, and the first network device configures, according to the first resource information, the terminal device to perform at least one of TX or RX in the at least one TTI. If the at least one TTI is the unavailable resource, the first resource information transmitted to the first network device by the terminal device includes information about the at least one TTI, and the first network device configures, according to the first resource information, the terminal device not to perform TX or RX, or not to perform both TX and RX in the at least one TTI.

The TX and RX mean transmission between the terminal device and the first network device. For example, TX includes an operation that the terminal device transmits data to the first network device and RX includes an operation that the terminal device receives data transmitted by the first network device.

In an embodiment, the at least one TTI may include multiple continuous TTIs or may also include multiple discontinuous TTIs.

In an embodiment, each of the at least one TTI may be equal in length. For example, a length of each of the at least one TTI is equal to 1 ms, or a length of each TTI is less than 1 ms and, for example, may be equal to 0.5 ms.

In an embodiment, the first resource information may further be used to indicate the length of each of the at least one TTI.

In the embodiment of the disclosure, the terminal device may further determine an interference degree of the unavailable resource. For example, when the unavailable resource includes the resource interfered with by the second resource, the interference degree may be used to represent a degree of interference of the second resource with the unavailable resource; when the unavailable resource includes the resource interfering with the second resource, the interference degree may be used to represent a degree of interference of the unavailable resource with the second resource.

In an embodiment, the interference degree may be classified by level and multiple interference degrees may be described through different levels. For example, the interference degrees may be divided into at least two levels, and the at least two levels are ranked in order from high to low or low to high interference degrees. For example, the at least two levels may include a first level and a second level, an interference degree corresponding to the first level is higher than an interference degree corresponding to the second level.

For convenient description, descriptions are made with the condition that the unavailable resource includes the resource interfered with by the second resource and the interference degree represents the degree of interference of the second resource with the unavailable resource as an example. For any resource, taking a first carrier as an example, the first carrier is interfered with by a second carrier, that is, the second carrier is the second resource. The terminal device determines that the first carrier is subjected to interference and determines a degree of the interference to which the first carrier is subjected is of the first level or the second level.

In an embodiment, the terminal device may determine, according to an interference level of the first carrier, whether the first carrier belongs to an unavailable resource. For example, when the interference level of the first carrier is the first level, it is determined that the first carrier is an unavailable resource, and the terminal device instructs, through the first resource information, the first network device not to allocate the first carrier to the terminal device; when the interference level of the first carrier is the second level, it is determined that the first carrier is still an available resource, and the terminal device instructs, through the first resource information, the first network device to allocate the first carrier to the terminal device.

In an embodiment, the terminal device may transmit the first resource information to the first network device, here, the first resource information includes an interference degree of the first carrier. The terminal device determines that the first carrier is subjected to interference and belongs to an unavailable resource, and determines that an interference level of the first carrier is the first level or the second level, and in such case, the terminal device transmits the first resource information to the first network device, here, the first resource information is used to indicate that the first carrier is the unavailable resource and to indicate the interference level of the first carrier. The first network device may determine, according to the interference level of the first carrier, whether to allocate the first carrier to the terminal device. For example, if the interference level of the first carrier is the first level, the first network device does not allocate the first carrier to the terminal device; if the interference level of the first carrier is the second level, the first network device may select to allocate the first carrier to the terminal device.

Accordingly, in the method for resource scheduling according to the embodiment of the disclosure, the terminal device may support at least two communication modes and may determine interference between resources used in different communication modes; and thus the terminal device may determines an unavailable resource and sends to a network device resource information indicating the unavailable resource, so that the network device allocates an available resource to the terminal device according to the resource information. Therefore, interference between transmission services in different communication modes may be reduced or avoided and transmission efficiency may be improved.

The method for resource scheduling according to the embodiments of the disclosure is described above in combination with FIG. 1 in detail from the angle of the terminal device. A method for resource scheduling according to the embodiments of the disclosure will be described below in combination with FIG. 2 from the angle of the network device.

FIG. 2 is a flowchart of a method 200 for resource scheduling according to an embodiment of the disclosure. The method 200 may be performed by a network device.

As illustrated in FIG. 2, the method 200 includes the following operations.

In S210, a first network device receives first resource information transmitted by a terminal device, here, the first resource information includes information about a first resource, the first resource includes an available resource or an unavailable resource, the unavailable resource includes at least one of: a resource interfered with by a second resource or a resource capable of interfering with the second resource, the available resource includes a resource except the unavailable resource, the terminal device is configured to communicate with the first network device in a first communication mode, and the second resource is used for the terminal device to communicate with a second network device in a second communication mode.

In S220, the first network device allocates a resource to the terminal device according to the first resource information.

In an embodiment, the first resource includes at least one carrier, and the operation that the first network device allocates the resource to the terminal device according to the first resource information includes the following operations.

When the first resource includes the available resource, the first network device allocates a carrier of the at least one carrier to the terminal device; when the first resource includes the unavailable resource, the first network device allocates a carrier except the at least one carrier to the terminal device.

In an embodiment, the at least one carrier includes multiple discontinuous carriers.

In an embodiment, the first resource includes at least one TTI, and the operation that the first network device allocates the resource to the terminal device according to the first resource information includes the following operations.

When the first resource includes the available resource, the first network device configures the terminal device to perform at least one of RX or TX with the first network device in the at least one TTI; when the first resource includes the unavailable resource, the first network device configures the terminal device to perform RX or TX with the first network device in the at least one TTI, or the first network device configures the terminal device not to perform RX and TX with the first network device in the at least one TTI.

In an embodiment, the at least one TTI is discontinuous.

In an embodiment, the first resource information includes a length of the at least one TTI.

In an embodiment, the first resource includes the unavailable resource, and the first resource information is used to indicate an interference degree of the unavailable resource, the interference degree includes at least one of: a degree of interference of the second resource with the unavailable resource or a degree of interference of the unavailable resource with the second resource.

The network device in the method 200 may correspond to the network device in the method 100 and the terminal device in the method 200 may correspond to the terminal device in the method 100. No more elaborations are made herein.

Accordingly, in the method for resource scheduling according to the embodiment of the disclosure, the network device receives resource information transmitted by the terminal device, here, the resource information indicates an unavailable resource, the unavailable resource may be determined by the terminal device supporting at least two communication modes, and the terminal device determines interference between resources used in different communication modes to further determine the unavailable resource; and the network device allocates an available resource to the terminal device according to the resource information. Therefore, interference between transmission services in different communication modes may be reduced or avoided and transmission efficiency may be improved.

In various embodiments of the disclosure, a magnitude of a sequence number of each operation does not mean an execution sequence and the execution sequence of each operation should be determined by its function and an internal logic and should not form any limit to an implementation process of the embodiments of the disclosure.

The methods for resource scheduling according to the embodiments of the disclosure are described above in combination with FIG. 1 to FIG. 2 in detail and a terminal device and network device according to the embodiments of the disclosure will be described below in combination with FIG. 3 to FIG. 6.

Figure 3:
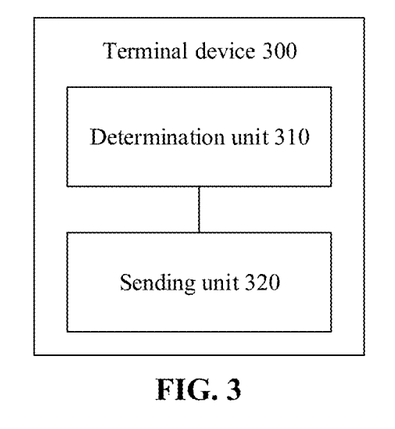
FIG. 3 is a block diagram of a terminal device according to an embodiment of the disclosure.

As illustrated in FIG. 3, a terminal device 300 according to an embodiment of the disclosure includes a determination unit 310 and a sending unit 320.

The determination unit 310 is configured to determine a first resource, here, the first resource includes an available resource or an unavailable resource, the unavailable resource includes at least one of a resource interfered with by a second resource or a resource capable of interfering with a second resource, the available resource includes a resource except the unavailable resource, and the second resource is used for the terminal device to communicate with a second network device in a second communication mode.

The sending unit 320 is configured to transmit first resource information to a first network device, here, the first resource information includes information about the first resource, the first resource information is used for the first network device to allocate a resource to the terminal device, and the terminal device is configured to communicate with the first network device in a first communication mode.

Accordingly, the terminal device of the embodiment of the disclosure may support at least two communication modes, and may determine interference between resources used in different communication modes to further determine an unavailable resource; and the terminal device may transmit to a network device resource information indicating the unavailable resource, so that the network device allocates an available resource to the terminal device according to the resource information. Therefore, interference between transmission services in different communication modes may be reduced or avoided and transmission efficiency may be improved.

In an embodiment, the first resource includes the available resource, the available resource includes at least one carrier, and the first resource information is used to instruct the first network device to allocate a carrier of the at least one carrier to the terminal device.

In an embodiment, the first resource includes the unavailable resource, the unavailable resource includes at least one carrier, and the first resource information is used to instruct the first network device to allocate a carrier except the at least one carrier to the terminal device.

In an embodiment, the at least one carrier includes multiple discontinuous carriers.

In an embodiment, the first resource includes the available resource, the available resource includes at least one TTI, and the first resource information is used to instruct the first network device to configure the terminal device to perform at least one of RX or TX with the first network device in the at least one TTI.

In an embodiment, the first resource includes the unavailable resource, the unavailable resource includes at least one TTI, and the first resource information is used to instruct the first network device to configure the terminal device to perform RX or TX with the first network device in the at least one TTI, or the first resource information is used to instruct the first network device to configure the terminal device not to perform RX and TX with the first network device in the at least one TTI.

In an embodiment, the at least one TTI is discontinuous.

In an embodiment, the first resource information includes a length of the at least one TTI.

In an embodiment, the first resource comprises the unavailable resource, and the first resource information is used to indicate an interference degree of the unavailable resource, the interference degree includes at least one of: a degree of interference of the second resource with the unavailable resource or a degree of interference of the unavailable resource with the second resource.

In an embodiment, the available resource includes a resource except the unavailable resource and a third resource, here, the third resource is used for the terminal device to communicate with another terminal device.

In an embodiment, the sending unit 310 is further configured to transmit second resource information to the second network device, here, the second resource information includes information about the second resource or another resource, and the another resource includes a resource except the second resource.

In an embodiment, interference between the unavailable resource and the second resource includes at least one of: cross modulation interference, harmonic interference, or harmonic mixing interference.

The terminal device 300 according to the embodiment of the disclosure may correspondingly perform the operations of the method 100 in the embodiment of the disclosure. Moreover, the abovementioned and other operations and/or functions of each unit in the terminal device 300 are adopted to implement the corresponding flows performed by the terminal device in each method illustrated in FIG. 1 to FIG. 2 and will not be elaborated herein for simplicity.

Accordingly, the terminal device of the embodiment of the disclosure may support the at least two communication modes, and may determine the interference between the resources used in different communication modes to further determine the unavailable resource; and the terminal device may transmit to the network device the resource information indicating the unavailable resource, so that the network device allocates the available resource to the terminal device according to the resource information. Therefore, the interference between the transmission services in different communication modes may be reduced or avoided and the transmission efficiency may be improved.

Figure 4:
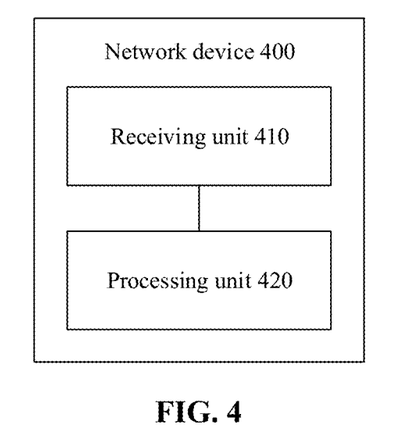
FIG. 4 is a block diagram of a network device according to an embodiment of the disclosure.

As illustrated in FIG. 4, a network device 400 according to an embodiment of the disclosure includes a receiving unit 410 and a processing unit 420.

The receiving unit 410 is configured to receive first resource information transmitted by a terminal device, here, the first resource information includes information about a first resource, the first resource includes an available resource or an unavailable resource, the unavailable resource includes at least one of: a resource interfered with by a second resource or a resource capable of interfering with a second resource, the available resource includes a resource except the unavailable resource, the terminal device is configured to communicate with the network device in a first communication mode, and the second resource is used for the terminal device to communicate with a second network device in a second communication mode.

The processing unit 420 is configured to allocate a resource to the terminal device according to the first resource information.

Accordingly, the network device of the embodiment of the disclosure receives resource information transmitted by the terminal device, here, the resource information indicates an unavailable resource, the unavailable resource may be determined by the terminal device supporting at least two communication modes, and the terminal device determines interference between resources used in different communication modes to further determine the unavailable resource; and the network device allocates an available resource to the terminal device according to the resource information. Therefore, interference between transmission services in different communication modes may be reduced or avoided and transmission efficiency may be improved.

In an embodiment, the first resource includes at least one carrier, and the processing unit 420 is configured to: when the first resource includes the available resource, allocate a carrier of the at least one carrier to the terminal device; when the first resource includes the unavailable resource, allocate a carrier except the at least one carrier to the terminal device.

In an embodiment, the at least one carrier includes multiple discontinuous carriers.

In an embodiment, the first resource includes at least one TTI, and the processing unit 420 is configured to: when the first resource includes the available resource, configure the terminal device to perform at least one of RX or TX with the network device in the at least one TTI; when the first resource includes the unavailable resource, configure the terminal device to perform RX or TX with the network device in the at least one TTI or configure the terminal device not to perform RX and TX with the network device in the at least one TTI.

In an embodiment, the at least one TTI is discontinuous.

In an embodiment, the first resource information includes a length of the at least one TTI.

In an embodiment, the first resource includes the unavailable resource, and the first resource information is used to indicate an interference degree of the unavailable resource, the interference degree includes at least one of: a degree of interference of the second resource with the unavailable resource or a degree of interference of the unavailable resource with the second resource.

The network device 400 according to the embodiment of the disclosure may correspondingly perform the operations of the method 200 in the embodiment of the disclosure. Moreover, the abovementioned and other operations and/or functions of each unit in the network device 400 are adopted to implement the corresponding flows performed by the network device in each method illustrated in FIG. 1 to FIG. 2 and will not be elaborated herein for simplicity.

Accordingly, the network device of the embodiment of the disclosure receives the resource information transmitted by the terminal device, here, the resource information indicates the unavailable resource, the unavailable resource may be determined by the terminal device supporting the at least two communication modes, and the terminal device determines the interference between the resources used in different communication modes to further determine the unavailable resource; and the network device allocates the available resource to the terminal device according to the resource information. Therefore, the interference between the transmission services in different communication modes may be reduced or avoided and the transmission efficiency may be improved.

Figure 5:
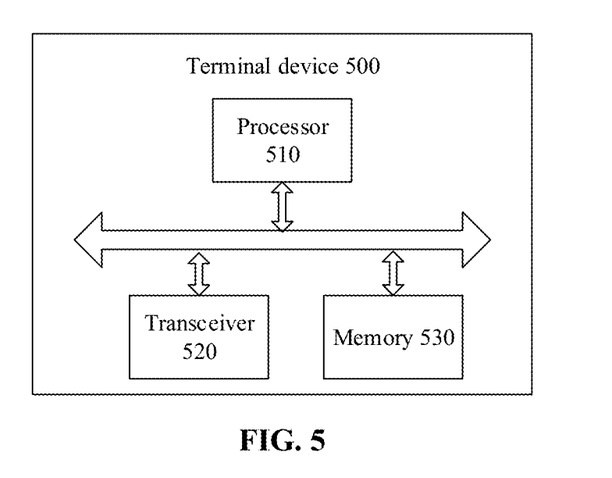
FIG. 5 is another block diagram of a terminal device according to an embodiment of the disclosure.

FIG. 5 is a block diagram of a terminal device 500 according to an embodiment of the disclosure. As illustrated in FIG. 5, the terminal device 500 includes a processor 510 and a transceiver 520. The processor 510 is connected with the transceiver 520. In an embodiment, the terminal device 500 further includes a memory 530. The memory 530 is connected with the processor 510. The processor 510, the memory 530 and the transceiver 520 communicate with one another through an internal connection path to transmit or receive at least one of control signals or data signals. The memory 530 may be configured to store an instruction. The processor 510 is configured to execute the instruction stored in the memory 530 to control the transceiver 520 to transmit or receive signaling or signals. The processor 510 is configured to determine a first resource, here, the first resource includes an available resource or an unavailable resource, the unavailable resource includes at least one of a resource interfered with by a second resource or a resource capable of interfering with a second resource, the available resource includes a resource except the unavailable resource, and the second resource is used for the terminal device to communicate with a second network device in a second communication mode. The transceiver 520 is configured to transmit first resource information to a first network device, here, the first resource information includes information about the first resource, the first resource information is used for the first network device to allocate a resource to the terminal device, and the terminal device is configured to communicate with the first network device in a first communication mode.

Accordingly, in the embodiment of the disclosure, the terminal device may support at least two communication modes, and may determine interference between resources used in different communication modes to further determine an unavailable resource; and the terminal device may transmit to a network device resource information indicating the unavailable resource, so that the network device allocates an available resource to the terminal device according to the resource information. Therefore, interference between transmission services in different communication modes may be reduced or avoided and transmission efficiency may be improved.

In an embodiment, the first resource includes the available resource, the available resource includes at least one carrier, and the first resource information is used to instruct the first network device to allocate a carrier of the at least one carrier to the terminal device.

In an embodiment, the first resource includes the unavailable resource, the unavailable resource includes at least one carrier, and the first resource information is used to instruct the first network device to allocate a carrier except the at least one carrier to the terminal device.

In an embodiment, the at least one carrier includes multiple discontinuous carriers.

In an embodiment, the first resource includes the available resource, the available resource includes at least one TTI, and the first resource information is used to instruct the first network device to configure the terminal device to perform at least one of RX or TX with the first network device in the at least one TTI.

In an embodiment, the first resource includes the unavailable resource, the unavailable resource includes at least one TTI, and the first resource information is used to instruct the first network device to configure the terminal device to perform RX or TX with the first network device in the at least one TTI, or the first resource information is used to instruct the first network device to configure the terminal device not to perform RX and TX with the first network device in the at least one TTI.

In an embodiment, the at least one TTI is discontinuous.

In an embodiment, the first resource information includes a length of the at least one TTI.

In an embodiment, the first resource includes the unavailable resource, and the first resource information is used to indicate an interference degree of the unavailable resource, the interference degree includes at least one of: a degree of interference of the second resource with the unavailable resource or a degree of interference of the unavailable resource with the second resource.

In an embodiment, the available resource includes a resource except the unavailable resource and a third resource, here, the third resource is used for the terminal device to communicate with another terminal device.

In an embodiment, the transceiver 520 is further configured to transmit second resource information to the second network device, here, the second resource information includes information about the second resource or another resource, and the another resource includes a resource except the second resource.

In an embodiment, interference between the unavailable resource and the second resource includes at least one of: cross modulation interference, harmonic interference, or harmonic mixing interference.

The terminal device 500 according to the embodiment of the disclosure may correspond to the terminal device 300 in the embodiment of the disclosure and may correspond to a performing entity of the method 100 according to the embodiment of the disclosure. Moreover, the abovementioned and other operations and/or functions of each unit in the terminal device 500 are adopted to implement the corresponding flows which are performed by the terminal device in each method illustrated in FIG. 1 and FIG. 2 and will not be elaborated herein for simplicity.

Accordingly, in the embodiment of the disclosure, the terminal device may support the at least two communication modes, and may determine the interference between the resources used in different communication modes to further determine the unavailable resource; and the terminal device may transmit to the network device the resource information used to indicate the unavailable resource, so that the network device allocates the available resource to the terminal device according to the resource information. Therefore, the interference between the transmission services in different communication modes may be reduced or avoided and the transmission efficiency may be improved.

Figure 6:
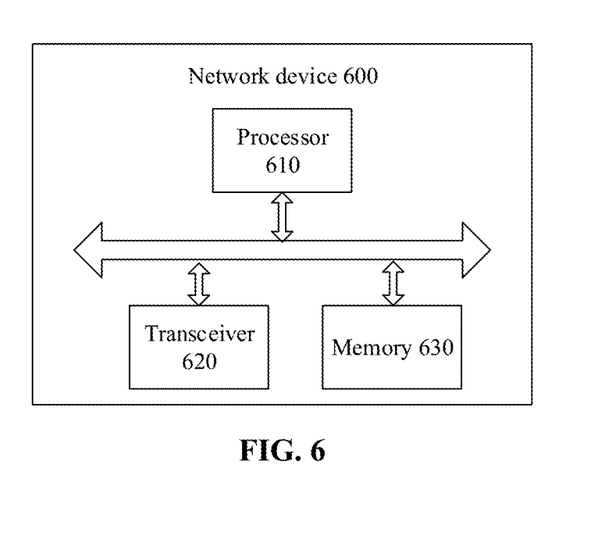
FIG. 6 is another block diagram of a network device according to an embodiment of the disclosure.

FIG. 6 is a block diagram of a network device 600 according to an embodiment of the disclosure. As illustrated in FIG. 6, the network device 600 includes a processor 610 and a transceiver 620. The processor 610 is connected with the transceiver 620. In an embodiment, the network device 600 further includes a memory 630. The memory 630 is connected with the processor 610. The processor 610, the memory 630 and the transceiver 620 communicate with one another through an internal connection path to transmit or receive at least one of control signals or data signals. The memory 630 may be configured to store an instruction. The processor 610 is configured to execute the instruction stored in the memory 630 to control the transceiver 620 to transmit or receive signaling or signals. The transceiver 620 is configured to receive first resource information transmitted by a terminal device, here, the first resource information includes information about a first resource, the first resource includes an available resource or an unavailable resource, the unavailable resource includes at least one of: a resource interfered with by a second resource or a resource capable of interfering with a second resource, the available resource includes a resource except the unavailable resource, the terminal device is configured to communicate with the network device in a first communication mode, and the second resource is used for the terminal device to communicate with a second network device in a second communication mode. The processor 610 is configured to allocate a resource to the terminal device according to the first resource information.

Accordingly, in the embodiment of the disclosure, the network device receives resource information transmitted by the terminal device, here, the resource information indicates an unavailable resource, the unavailable resource may be determined by the terminal device supporting at least two communication modes, and the terminal device determines interference between resources used in different communication modes to further determine the unavailable resource; and the network device allocates an available resource to the terminal device according to the resource information. Therefore, interference between transmission services in different communication modes may be reduced or avoided and transmission efficiency may be improved.

In an embodiment, the first resource includes at least one carrier, and the processor 610 is configured to: when the first resource includes the available resource, allocate a carrier of the at least one carrier to the terminal device; when the first resource includes the unavailable resource, allocate a carrier except the at least one carrier to the terminal device.

In an embodiment, the at least one carrier includes multiple discontinuous carriers.

In an embodiment, the first resource includes at least one TTI, and the processor 610 is configured to: when the first resource includes the available resource, configure the terminal device to perform at least one of RX or TX with the network device in the at least one TTI; when the first resource includes the unavailable resource, configure the terminal device to perform RX or TX with the network device in the at least one TTI or configure the terminal device not to perform RX and TX with the network device in the at least one TTI.

In an embodiment, the at least one TTI is discontinuous.

In an embodiment, the first resource information includes a length of the at least one TTI.

In an embodiment, the first resource includes the unavailable resource, and the first resource information is used to indicate an interference degree of the unavailable resource, the interference degree includes at least one of: a degree of interference of the second resource with the unavailable resource or a degree of interference of the unavailable resource with the second resource.

The network device 600 according to the embodiment of the disclosure may correspond to the network device 400 in the embodiment of the disclosure and may correspond to a performing entity of the method 200 according to the embodiment of the disclosure. Moreover, the abovementioned and other operations and/or functions of each unit in the network device 600 are adopted to implement the corresponding flows which are performed by the network device in each method illustrated in FIG. 1 to FIG. 2 and will not be elaborated herein for simplicity.

Accordingly, in the embodiment of the disclosure, the network device receives the resource information transmitted by the terminal device, here, the resource information indicates the unavailable resource, the unavailable resource may be determined by the terminal device supporting the at least two communication modes, and the terminal device determines the interference between the resources used in different communication modes to further determine the unavailable resource; and the network device allocates the available resource to the terminal device according to the resource information. Therefore, the interference between the transmission services in different communication modes may be reduced or avoided and the transmission efficiency may be improved.

The method embodiments of the disclosure may be applied to a processor or be implemented by the processor. The processor may be an integrated circuit chip with a signal processing capability. In an implementation process, each operation of the method embodiment may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or other programmable logical devices, discrete gate or transistor logical device and discrete hardware component. Each method, operation and logical block diagram disclosed in the embodiments of the disclosure may be implemented or executed. The universal processor may be a microprocessor or the processor may also be any conventional processor and the like. The operations of the method disclosed in combination with the embodiments of the disclosure may be directly embodied to be executed and completed by a hardware decoding processor or executed and completed by a combination of hardware and software modules in the decoding processor. The software module may be located in a mature storage medium in this field, such as a Random Access Memory (RAM), a flash memory, a Read-Only Memory (ROM), a Programmable ROM (PROM), Electrically Erasable PROM (EEPROM) and a register. The storage medium is located in a memory, and the processor reads information in the memory and completes the operations of the methods in combination with hardware.

The memory in the embodiment of the disclosure may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). The memories of a system and method described in the disclosure is intended to include, but not limited to, memories of these and any other proper types.

In addition, term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Those of ordinary skill in the art may realize that the units and algorithm operations of each example described in combination with the embodiments of the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working process of the system, device and unit described above may refer to the corresponding processes in the method embodiments and will not be elaborated herein for convenient and brief description.

In some embodiments provided by the disclosure, the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between components displayed or discussed may be indirect coupling or communication connection of the devices or the units through some interfaces, and may be electrical, mechanical or other forms.

The units described as separate parts may or may not be physically separated, and parts displayed as units may or may not be physical units. That is, the units may be located in the same place, or may also be distributed to multiple network units. Part or all of the units may be selected according to a practical requirement to achieve the purpose of the solutions of the embodiments.

In addition, each functional unit in each embodiment of the disclosure may be integrated into a processing unit. Each unit may also physically exist independently, or two or more than two units may also be integrated into a unit.

When being realized in form of software functional unit and being sold or used as an independent product, the function may also be stored in a computer-readable storage medium. Based on such an understanding, the technical solutions of the disclosure substantially or parts making contributions to the related art or part of the technical solutions may be embodied in form of software product. The computer software product is stored in a storage medium and includes a plurality of instructions configured to enable a computer device (which may be a personal computer, a server, a network device or the like) to execute all or part of the operations of the method in each embodiment of the disclosure. The storage medium includes various media capable of storing program codes, such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. A method for resource scheduling, comprising:
   determining, by a terminal device, a first resource, wherein the first resource comprises an unavailable resource, the unavailable resource comprises at least one of: a resource interfered with by a second resource or a resource capable of interfering with a second resource, and the second resource is used for the terminal device to communicate with a second network device in a second communication mode; and
   transmitting, by the terminal device, first resource information to a first network device, wherein the first resource information comprises information about the first resource, the first resource information is used for the first network device to allocate a resource to the terminal device, and the terminal device is configured to communicate with the first network device in a first communication mode,
   wherein the first resource information is used to indicate an interference degree of the unavailable resource, the interference degree comprises at least one of: a degree of interference of the second resource with the unavailable resource or a degree of interference of the unavailable resource with the second resource.

2. The method of claim 1, wherein the unavailable resource comprises at least one carrier, and the first resource information is used to instruct the first network device to allocate a carrier except the at least one carrier to the terminal device.

3. The method of claim 2, wherein the at least one carrier comprises a plurality of discontinuous carriers.

4. The method of claim 1, wherein the unavailable resource comprises at least one TTI, and the first resource information is used to instruct the first network device to configure the terminal device to perform Reception (RX) or Transmission (TX) with the first network device in the at least one TTI, or the first resource information is used to instruct the first network device to configure the terminal device not to perform Reception (RX) and Transmission (TX) with the first network device in the at least one TTI.

5. The method of claim 4, wherein the at least one TTI is discontinuous.

6. The method of claim 4, wherein the first resource information comprises a length of the at least one TTI.

7. The method of claim 1, further comprising:
   transmitting, by the terminal device, second resource information to the second network device, wherein the second resource information comprises information about the second resource or another resource, and the another resource comprises a resource except the second resource.

8. A terminal device, comprising:
   a processor, configured to determine a first resource, the first resource comprising at least one Transmission Time Interval (TTI); and
   a transceiver, configured to transmit first resource information to a first network device, wherein the first resource information comprises information about the first resource, the first resource information is used for the first network device to allocate a resource to the terminal device, and the terminal device is configured to communicate with the first network device in a first communication mode;
   wherein responsive to the first resource being an unavailable resource, the first resource information is used to instruct the first network device to configure the terminal device to perform Reception (RX) or Transmission (TX) with the first network device in the at least one TTI, or the first resource information is used to instruct the first network device to configure the terminal device not to perform Reception (RX) and Transmission (TX) with the first network device in the at least one TTI, wherein the unavailable resource comprises at least one of: a resource interfered with by a second resource or a resource capable of interfering with a second resource, and the second resource is used for the terminal device to communicate with a second network device in a second communication mode;
   responsive to the first resource being an available resource, the available resource comprising a resource except the unavailable resource, the first resource information is used to instruct the first network device to configure the terminal device to perform at least one of Reception (RX) or Transmission (TX) with the first network device in the at least one TTI; and
   wherein the first communication mode is a Long Term Evolution (LTE) communication mode and the second communication mode is a New Radio (NR) communication mode.

9. The terminal device of claim 8, wherein the first resource further comprises at least one carrier,
responsive to the first resource being the available resource, the first resource information is used to instruct the first network device to allocate a carrier of the at least one carrier to the terminal device;
responsive to the first resource being the unavailable resource, the first resource information is used to instruct the first network device to allocate a carrier except the at least one carrier to the terminal device.

10. The terminal device of claim 9, wherein the at least one carrier comprises a plurality of discontinuous carriers.

11. The terminal device of claim 8, wherein the at least one TTI is discontinuous.

12. The terminal device of claim 8, wherein the first resource information comprises a length of the at least one TTI.

13. A terminal device, comprising:
a processor, configured to determine a first resource, wherein the first resource comprises an unavailable resource, the unavailable resource comprises at least one of: a resource interfered with by a second resource or a resource capable of interfering with a second resource, and the second resource is used for the terminal device to communicate with a second network device in a second communication mode; and
a transceiver, configured to transmit first resource information to a first network device, wherein the first resource information comprises information about the first resource, the first resource information is used for the first network device to allocate a resource to the terminal device, and the terminal device is configured to communicate with the first network device in a first communication mode,
wherein the first resource information is used to indicate an interference degree of the unavailable resource, the interference degree comprising at least one of: a degree of interference of the second resource with the unavailable resource or a degree of interference of the unavailable resource with the second resource.

14. The terminal device of claim 8, wherein the available resource comprises a resource except the unavailable resource and a third resource, and the third resource is used for the terminal device to communicate with another terminal device.

15. The terminal device of claim 8, wherein the transceiver is further configured to:
transmit second resource information to the second network device, wherein the second resource information comprises information about the second resource or another resource, and the another resource comprises a resource except the second resource.

16. The terminal device of claim 8, wherein interference between the unavailable resource and the second resource comprises at least one of: cross modulation interference, harmonic interference, or harmonic mixing interference.

17. The terminal device of claim 13, wherein the unavailable resource comprises at least one carrier, and the first resource information is used to instruct the first network device to allocate a carrier except the at least one carrier to the terminal device.

18. The terminal device of claim 13, wherein the at least one carrier comprises a plurality of discontinuous carriers.

19. The terminal device of claim 13, wherein the unavailable resource comprises at least one TTI, and the first resource information is used to instruct the first network device to configure the terminal device to perform Reception (RX) or Transmission (TX) with the first network device in the at least one TTI, or the first resource information is used to instruct the first network device to configure the terminal device not to perform Reception (RX) and Transmission (TX) with the first network device in the at least one TTI.

20. The terminal device of claim 13, wherein the at least one TTI is discontinuous.

* * * * *